United States Patent

Hogg

[15] 3,689,833
[45] Sept. 5, 1972

[54] PARTICLE ANALYZING APPARATUS

[72] Inventor: Walter R. Hogg, Miami Lakes, Fla.

[73] Assignee: Coulter Electronics, Inc., Miami, Fla.

[22] Filed: June 29, 1971

[21] Appl. No.: 157,829

[52] U.S. Cl............324/71 CP, 73/194 E, 324/30 R, 336/222
[51] Int. Cl.............................................G01n 27/08
[58] Field of Search...324/71 CP, 71 R, 30; 336/222; 73/194 E, 194 EM

[56] References Cited

UNITED STATES PATENTS

| | | | |
|---|---|---|---|
| 2,625,588 | 1/1953 | Peters | 336/222 |
| 1,981,066 | 11/1934 | Osnos | 336/222 |
| 3,502,974 | 3/1970 | Coulter | 324/71 |

Primary Examiner—Rudolph V. Rolinec
Assistant Examiner—David M. Carter
Attorney—I. Irving Silverman et al.

[57] ABSTRACT

Electronic particle analyzing apparatus operating in accordance with the Coulter principle in which it is desired to isolate the aperture electrically from the electrolyte or suspending fluid flow system without breaking the flow of liquid. The metal-fluid interface normally provided by immersed electrodes is here provided by metallic conduit. The metallic conduit for the flowing particle-carrying medium is provided in the form of a helical coil having capacitive reactance means connected across the coil enabling the coil to act as an inductance and the combination to be tuned for any desired purpose. The principal purpose for such tuning is to achieve resonance, as for example, parallel resonance in which case the metallic conduit is frequency selective. In the case of parallel resonance, the metallic conduit presents high impedance to the flow of resultant electrical signals so as to isolate the aperture as stated. Other uses for resonance in metallic coils carrying liquid with suspended particles are described. In all cases the electric current is at high frequency.

26 Claims, 8 Drawing Figures

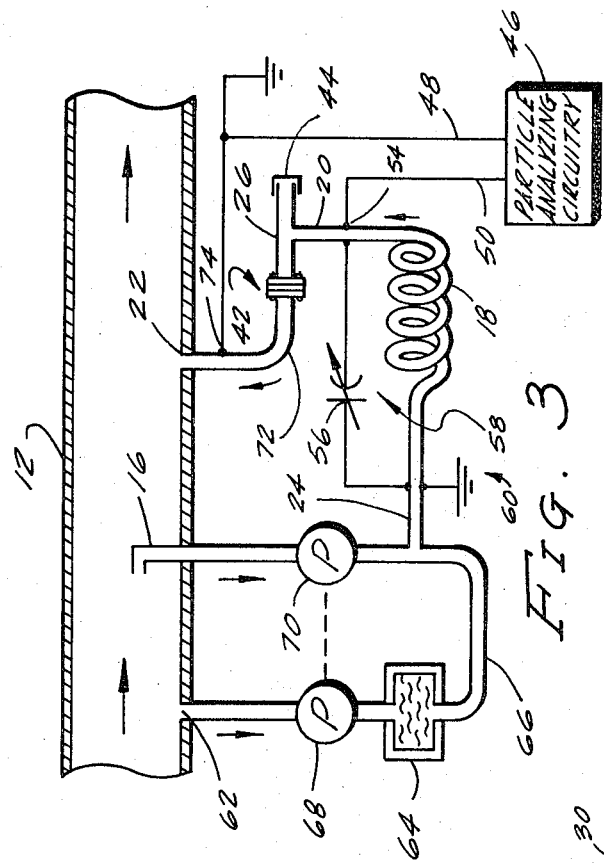
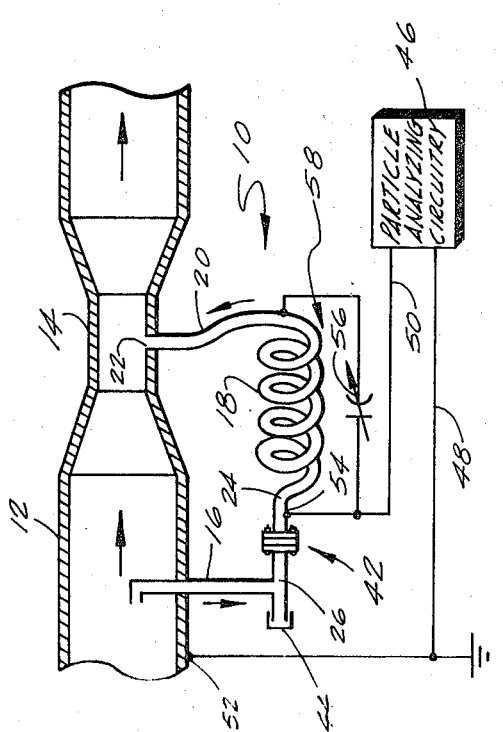
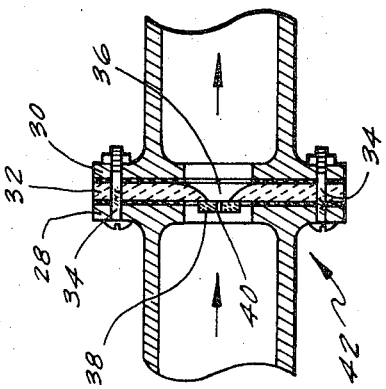

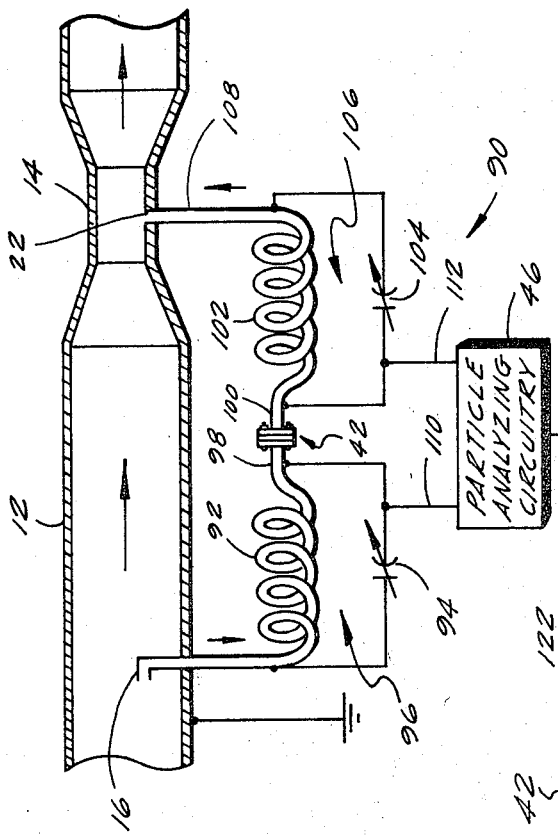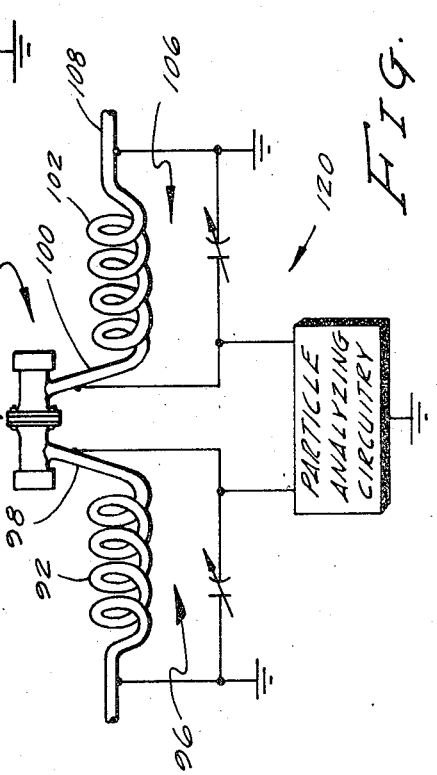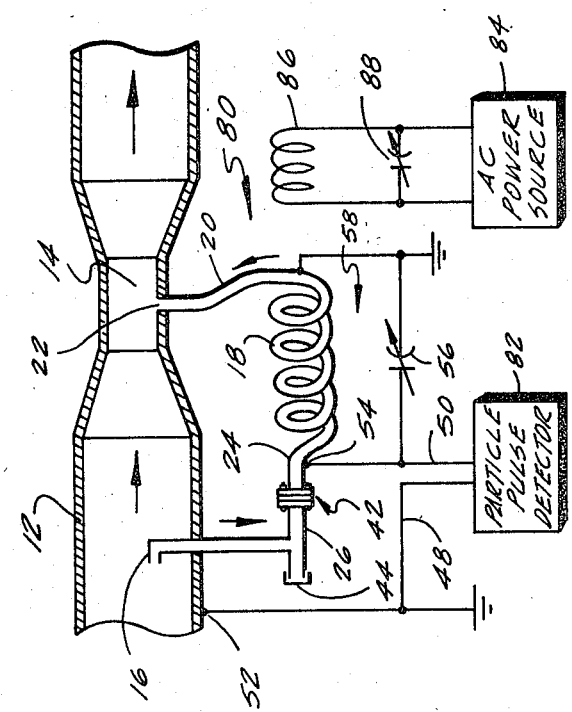

PARTICLE ANALYZING APPARATUS

BACKGROUND OF THE INVENTION

The invention herein is primarily concerned with apparatus which is used for making studies of particulate systems in which the particles are of microscopic size and are suspended in some electrolyte. The properties which are studied are the size and the numbers of such particles, primarily, but related studies are not excluded. For example, through the use of high frequencies the physical character of different particulate materials may be studied where the sizes of the same particles may be similar but the responses be different when subjected to high frequency or different frequencies or combinations of high frequency and low frequency currents.

Reference may be made to four different U.S. patents which are owned by the assignee of this application to assist in the understanding and appreciation of the invention. These patents are U.S. Pat. No. 2,656,508, issued Oct. 20, 1953 to Wallace H. Coulter and entitled "Means for Counting Particles Suspended In A Fluid"; U.S. Pat. No. 3,502,974 issued Mar. 24, 1970 to Wallace H. Coulter and Walter R. Hogg and entitled "Signal Modulated Apparatus for Generating and Detecting Resistive and Reactive Changes in A Modulated Current Path for Particle Classification and Analysis"; U.S. Pat. No. 3,539,919 issued Nov. 10, 1970 to W. R. Hogg and entitled "Method for Making Glass Aperture Tube and Product Produced Thereby"; and U.S. Pat. No. 3,340,470 issued Sept. 5, 1967 to J. R. Coulter, Jr. and entitled "Flow-Through Sample Apparatus For Use With Electrical Particle Study Device."

The first of these patents constitutes the basic Coulter patent which discloses the well-known Coulter principle and describes simple apparatus for practicing the same. According to this principle, when a microscopic particle is suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle size or volume for most biological and industrial purposes. Apparatus embodying the teachings of said U.S. Pat. No. 2,656,508 has been used to count and make sizing studies of particles in biological fluids, industrial powders and slurries, etc.

The second of these patents, U.S. Pat. No. 3,502,974 is concerned with apparatus of the Coulter type in which, instead of the direct current or low frequency which has been almost universally used in Coulter apparatus, high frequency aperture current is utilized. Such apparatus may be used to study particle systems in which the responses of particles passing through the aperture of a Coulter particle studying device differs from those received when the aperture current is d.c. on account of the materials from which the particles are made. Many problems arise through the use of high frequency aperture current and the invention herein attacks one of these problems.

The third of these patents, U.S. Pat. No. 3,539,919, is concerned with a novel construction of an aperture tube in which there is a double wall between the body of electrolyte on the interior of the aperture tube and that on the exterior thereof, for example, in the beaker in which the aperture tube is immersed. The problem which is solved by this structure occurs when high frequency aperture current is used. The capacitive coupling between the outer and inner bodies of liquid in structures without the double wall causes electric current at high frequency to leak through the single wall. The double wall adds an air space in addition to the two thicknesses of glass to decrease the capacitive coupling and hence the leakage. The pertinence of this patent is primarily in connection with one embodiment of the invention herein in which the system involved is a modified flow-through system. The most advantages of the invention accrue in an on-stream arrangement, this being the primary environment of the invention herein. This is not to be considered a limitation.

The fourth of the patents, U.S. Pat. No. 3,340,470 illustrates the use of a drip chamber for breaking the flow of electric current in apparatus having a continuous flow of electrolyte. Certain disadvantages of the drip chamber will be explained hereinafter in order to show how the invention provides a substantial improvement over the same.

In the Coulter type particle analyzing apparatus which utilizes a high frequency aperture current, either alone or in addition to other electrical currents, one of the parameters which may be measured by the apparatus each time that a particle passes through the aperture is capacitance. In known techniques, as described in connection with U.S. Pat. No. 3,340,470 referred to above, when such apparatus is to be used in a flow-through environment, as opposed to batch apparatus as described in connection with U.S. Pat. 2,869,078, a so-called drip chamber is utilized to break the electrical connection on one side of the aperture so that the electrolyte path does not short circuit the signal generated in the aperture. Another reason for isolating the aperture electrically, even in the case of d.c. aperture current in a flow-through apparatus is to eliminate noise.

The drip chamber is not satisfactory for use in high frequency apparatus because the droplets of suspension falling from the conduit in the drip chamber vary the capacitance in the circuit in a saw-tooth manner and these capacity changes are large compared with the signals sought to be obtained from the passage of particles through the aperture.

The tendency of industry today toward automation and computerization has created a demand for on-stream instrumentation where the character of all manner of liquids must be assessed without stopping the flow and without withdrawing batches for sampling. The liquid or fluid may be of extremes in temperature, may be corrosive, may be a slurry, may be at high pressures or may be running at very high or very low rates of flow. The counting and sizing of particles in such streams can be accomplished using the structures of the invention herein without the need for complex apparatus, but using the Coulter principle.

The use of high frequency for particle measurement provides a valuable tool for industry because there are many instances in which d.c. aperture currents are not permissible, as for example, in cases where particle differences due to materials must be detected, or where it is preferable to have the instrument sensitive to capacitive changes only, or where the d.c. would cause undesirable chemical effects.

The principal benefit of the invention lies in isolating the aperture from short-circuiting connections while carrying liquid passing through the aperture. Mixing can also be accomplished using the apparatus. The conduit which is used can provide appropriate impedance to high frequency electric current while at the same time acting as a low impedance to fluids.

SUMMARY OF THE INVENTION

According to the invention, the suspension which is being flowed through a Coulter aperture from one body of liquid to another is conducted through a coiled metal pipe which is tuned by some suitable capacitive reactance to reject or pass certain frequencies, the Coulter aperture being part of an apparatus which is being used to analyze particulate matter carried by the liquid. The aperture current in this case is at high frequency, and the principal use for the tuned circuit is to enable the passage of the electrolyte while providing the requisite electrical impedances for associated electronic circuitry. In this way the aperture current is not shorted out by the hydraulic apparatus and some types of noise are also eliminated. The apparatus is especially useful in flow-through systems where there must be a continuous flow of the suspension, the invention preventing the electric current from entering the main stream.

The invention also lies in several different forms of apparatus which provide other functions to be explained.

BRIEF DESCRIPTION OF THE DRAWINGS

FIG. 1 is a diagrammatic view illustrating the invention embodied in a relatively simple flow-through apparatus;

FIG. 2 is a fragmentary sectional view through one of the conduits of the liquid by-pass circuit of apparatus of FIG. 1 showing the installation of the aperture in said conduit;

FIG. 3 is a diagrammatic view illustrating a modified form of the invention in which pumps and a filter are used in the liquid by-pass circuit for certain purposes;

FIG. 4 is a diagrammatic view similar to that of FIG. 1 but illustrating a technique for inducing the aperture current into the liquid by-pass circuit without a direct connection therewith;

FIG. 5 is a diagrammatic view illustrating the invention applied to apparatus in which both sides of the aperture have tuned circuits associated with the liquid by-pass circuit;

FIG. 6 is a diagrammatic view illustrating a modified form of the apparatus of FIG. 5;

DESCRIPTION OF THE PREFERRED EMBODIMENTS

Figure 7:
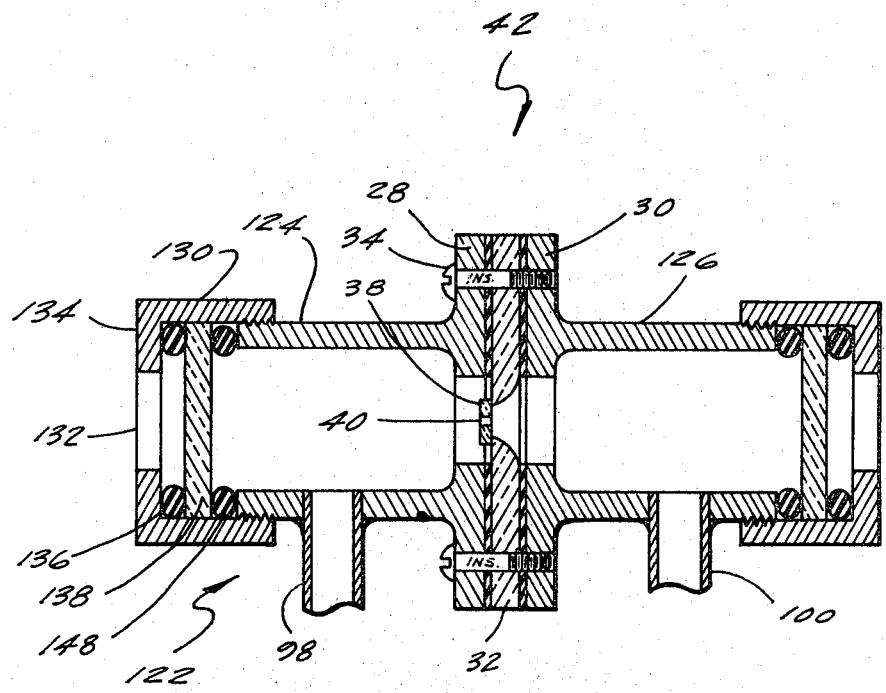
FIG. 7 is a median sectional view through the combined clean-out and inspection assembly of FIG. 6.

The familiar Coulter apparatus as known today for the most part is used in batch measurements with lesser utilization in flow-through or on-stream measurements. In these arrangements there is required to be a body of liquid on opposite sides of an aperture with the liquid and electric current flowing through the aperture simultaneously, from one body of liquid to the other. The particles are in suspension, at least in the upstream body of liquid and are carried through the aperture. The flow of electric current produces a field in the aperture which is not confined to the liquid geometrically defined by the aperture, but extends substantially outward from the open ends of the aperture. Studies have been made of this field, and generally, for the sharp-edged type of apertures which are substantially in universal use today, the current density varies throughout this region but is most uniform in the axial center of the aperture and in its middle point between the ends.

The current which flows in the aperture is provided by a suitable current source which is required to be "coupled" to the liquid so that the current flow will occur through the aperture. The barrier between the two bodies of liquid is of insulating material with the aperture providing the only relief. The normal means for coupling the current source to the respective bodies of liquid comprise platinum electrodes immersed in the respective bodies and connected to the source by means of conductors. This provides what may be termed a metal-fluid interface in each body and the field is established by these metal-fluid interfaces.

In the several embodiments of the invention, a metal-fluid interface is provided by a metallic conduit carrying the liquid. There may be a pair of conduits on opposite ends of the aperture, or conduit on one side and a vessel of liquid on the other. There may be a pair of vessels with the aperture between them. In any event, the liquid will be considered a body whether it is in a vessel or a conduit, and the structure which contains the liquid may be considered a container in the broadest sense including conduit or vessel, and whether the body of liquid in the structure is static or being continuously replenished. Obviously, in an on-stream or continuous flow-through structure, the containers will be pipes or conduits and the bodies will be continuously flowing.

The reference character 10 is used to designate apparatus constructed in accordance with the invention and illustrated in FIG. 1. This arrangement is characterized by the provision of a liquid by-pass circuit in which there is a main liquid carrying pipe or conduit 12 having a section of decreased diameter at 14 to create a pressure differential between a location in the pipe 12 ahead of the decreased diameter section and a point at the decreased diameter section 14. The flow of liquid in this case is from left to right as indicated by the arrows. At the location upstream of the decreased diameter section 14 there is an impact probe 16 inserted into the main stream of the pipe 12 opening into the main stream. Suspension carried by the pipe 12 will flow through the pipe but a small quantity will be by-passed through the impact probe 16, the coiled conduit 18 and the tail 20 of the conduit 18 and returned to the decreased diameter section 14 by way of the discharge port 22.

The by-pass flow is indicated by arrows alongside of the probe 16 and the tail 20.

The leading conduit end 24 of the coil 18 is connected to a T-shaped fitting 26, one arm of which has a flange 28 (FIG. 2) that faces a similar flange 30 mounted on the end 24, there being a partition 32 sandwiched between the flanges and held in place by bolts 34. The partition 32 is made of some insulating material such as a plastic or glass having low electrical leakage at high frequency, and likewise the bolts 34 are of similar insulating material. There is an orifice 36 formed in the center of the partition 32 and a wafer 38 having a minute aperture 40 is secured over the orifice 36. The illustrations being diagrammatic in nature, the dimensions are not necessarily according to scale. The aperture 40 may be microscopic and the wafer 38 may be a small disc of corundum or the like fused or otherwise secured to the partition 32. The diameter of the by-pass conduit from which the coil 18 and connecting lines are made may be of the order of a fraction of an inch. Additionally, any other structure for mounting an aperture wafer and aperture in the by-pass circuit may be used. For purposes of encompassing any suitable type of structure, the structure of FIG. 2 may be designated generally as aperture carrying means 42. The entire length of fluid-carrying conduit which includes the probe 16, T-fitting 26, end 24, coil 18, tail 20 and the discharge port 22 will be referred to as a liquid by-pass circuit. The metal-fluid interfaces are provided by the interior surfaces of the T-fitting 26 and the coil 18 at its leading end 24.

The left-hand arm of the T-fitting 26 has a removable end cap 44 which may be used to clean out the T-fitting.

The aperture 40 comprises the Coulter aperture and particle analyzing circuitry 46 combines therewith to provide a Coulter-type particle analyzing device. For this purpose, there is one lead 48 that makes electrical connection with the electrolyte in the liquid by-pass circuit on the left side of the aperture 40 through the metal-fluid interface of T-section 26 and another lead 50 which is connected to the electrolyte on the right side of the aperture 40 through the metal-fluid interface of the lead end 24. The main pipe 12 is grounded, as shown at 52, as is the lead 48. As for the lead 50, it is connected at 54 with the leading end 24. Between the point 54 and the port 22 there are two parallel electrical branches, one being the capacitive branch having the variable tuning condenser 56 therein and the other being the inductive branch comprising the coil 18. The condenser 56 is tuned so that the two branches form a parallel resonant circuit 58 having very high impedance to flow of electric current at the frequency which is being supplied by the circuitry 46. The tail 20 contacts the main pipe 12 at the reduced diameter section 14, but due to the presence of the parallel resonant circuit 58, there will be very little flow of electric current through the coil 18 and no short-circuiting of the aperture 40 so that it develops its full signal when a particle traverses the same. The flow of liquid through the by-pass circuit is in no way affected by the electrical effect of the tuned circuit 58.

It is assumed that the pipe 12 and all conduits of the liquid by-pass circuit are metal.

In FIG. 3, the reference character 60 designates generally apparatus of a somewhat modified form. In this case, the main pipe 12 need not have a reduced diameter section similar to 14 in FIG. 1. The outlet port 22 for the liquid by-pass circuit empties at the point shown. The material in suspension in the pipe 12 is assumed to be required to be diluted because of its heavy particle concentration, and hence there is an inlet 62 in addition to the impact probe 16 which draws in suspension and filters it in filter 64 before discharging the remaining liquid to the connecting conduit 66. The impact probe 16 connects through the pump 70 to the leading end 24 of the coil 18. Proportional positive displacement pumps 68 and 70 control the dilution of suspension which passes through the coil 18. The tail end 20 of the coil connects with the T-fitting 26 downstream of the coil 18 instead of upstream as in FIG. 1.

The aperture carrying means 42 is in the left arm of the T-fitting 26, a clean-out and inspection cap 44 is in the right arm and a connecting conduit 72 conducts fluid to the discharge port 22. The particle analyzing circuitry 46 has its grounded lead 48 connected to conduit 72 at 74. The "hot" lead 50 connects to the tail 20 at 54. Tuning capacitor 56 is in parallel with coil 18 to form tuned circuit 58.

In this embodiment, the suspension is diluted by the ratio of the flow rates of positive displacement pumps 68 and 70, mixed in the coil 18 before measurements are made and then discharged at 22. The advantages of the apparatus 10 of FIG. 1 also accrue.

The apparatus 80 of FIG. 4 differs from the apparatus 10 and the apparatus 60 in that the particle analyzing circuitry is constituted of two parts, namely, the detector 82 and the a.c. power source 84. In this case, components carry the same reference numerals as the components of FIG. 1 which have the same or substantially the same function. The aperture current is provided by the a.c. power source 84 which is connected to a primary winding 86 suitably tuned by the condenser 88. The coil 18 comprises a secondary winding and through the inductive coupling afforded by the proximity of the two windings, an electric current is induced in the coil 18. The condenser 56 in the tuned circuit 58 is in this case adjusted for providing series resonance so that the current is available in the aperture. Electrical leads 48 and 50 connect the detector 82 across the aperture.

The apparatus 90 illustrated in FIG. 5 provides additional advantages. In this case there is an impact probe 16 which is inserted into the main flow of the pipe 12, with a discharge port 22 in the narrow section 14 of the pipe. The impact probe 16 connects directly with a first coil 92 across which there is a tuning condenser 94, these together forming a first tuned circuit 96. The tail 98 of the first coil 92 is connected to the lead end 100 of a second coil 102 by means of the aperture carrying means 42 across which there is a second tuning condenser 104 that completes the second tuned circuit 106. The tail 108 of the coil 102 leads to the discharge port 22. The particle analyzing device 46 in this apparatus 90 is connected across the aperture in the aperture carrying means 42 positioned between the two coils by means of the leads 110 and 112 neither of which is grounded. In this case, the metal-fluid interfaces are provided by the coils on opposite sides of the aperture — actually between the tail 98 and the lead end 100.

The apparatus 120 of FIG. 6 differs from the apparatus 90 of FIG. 5 in that a novel clean-out and inspection structure is used. The tail end 98 of the first coil 92 and the lead end 100 of the second coil 102 are connected to a combined clean-out and inspection assembly 122 which is shown in detail in FIG. 7. There is a pair of short pipe sections 124 and 126 each of which has an inner flange 28 and 30, the insulating plate 32 carrying the wafer 38 and held together by the insulating bolts 34, thereby providing the aperture assembly 42 which differs very little from those thus far described. In addition, the end 98 connects to the pipe 124 while the end 100 connects to the pipe 126. Each pipe section has its outer end threaded to receive a threaded sleeve 130 provided with an end opening 132 defining an annular internal flange 134. The flange 134 engages in each case an O-ring 136, a glass disc 138, and a second O-ring 140, tightly pressing the assembly against the end of the pipe 124 or 126 in a liquid-tight connection. The sleeve 130 may be unscrewed to give access to the aperture 40 of the wafer 38 or to clean out any debris which may have accumulated in the assembly. The aperture may be viewed from each side through the respective glasses, and if desired, the aperture may be illuminated by a beam of light axially projected through the assembly to enable the aperture 40 to be visually inspected under light or its image projected upon a screen or a microscope objective.

In the apparatus 90 and 120 both sides of the aperture are isolated from ground. This arrangement permits greater circuit flexibility, for example, symmetrical a.c. circuitry, differential amplifiers, tapped coils and the like in the circuitry 46.

Especially, this construction permits resonating the coils at two different frequencies using additional coils, tapped coils and additional capacitors to achieve any desired frequency response. If one coil is resonated at a frequency $f1$ and the other at a frequency $f2$, the $f2$ coil aperture electrode will appear to be at ground for the frequency $f1$ and vice versa. This provides convenience circuitwise.

Figure 8:
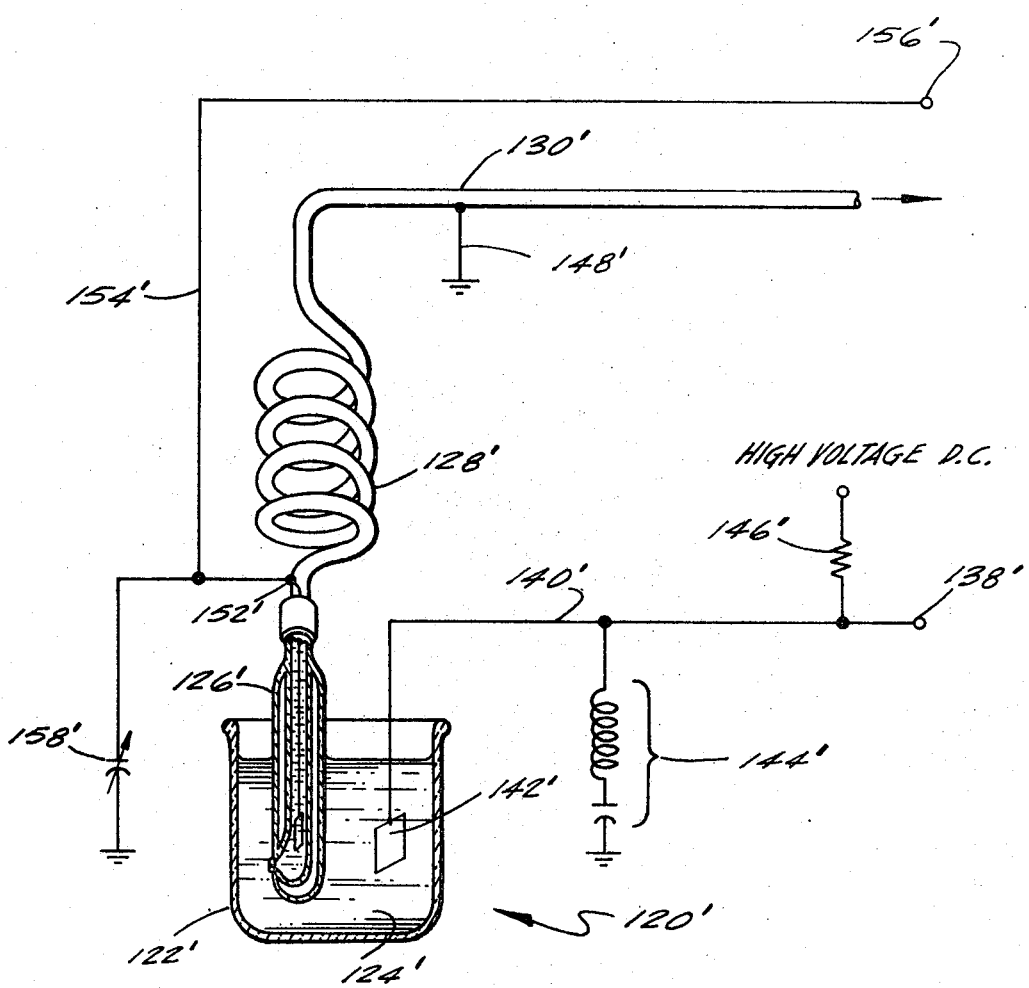
FIG. 8 is a diagrammatic view of apparatus constructed in accordance with the invention but using a modified flow-through type of liquid flow and in which both d.c. and a.c. electrical sensing zone excitation is used.

The apparatus 120' illustrated in FIG. 8 is characterized by the use of a dual frequency excitation as taught in U.S. Pat. No. 3,502,974 in which there is a high frequency current and a low frequency current flowing in the aperture simultaneously with the flow of liquid suspension. The low frequency may be considered d.c. in this example.

There is a beaker 122' which carries a body 124' of suspension to be studied. The aperture tube 126' is of the construction of U.S. Pat. No. 3,539,919 with the suspension being continuously drawn through the aperture to the interior of the tube 126', passing through the coil 128' which is of metal, thence by way of the tail 130' to a source of vacuum. The d.c. terminal 138' leads to the detector (not shown) which senses changes of impedance as described in above-mentioned patents caused by particle passing through the aperture. The lead 140' from this terminal connects to the electrode 142' that is immersed in the suspension 124'. This same lead is connected to ground through a series resonant circuit 144' and to a high voltage d.c. source through the resistor 146'. The line 130' which is also metal is grounded at 148'. The interior electrode 150' is connected to the metal end of the coil 128' at 152', there also being an electrical lead 154' connecting the r.f. detector (not shown) terminal 156' thereto. The tuning capacitor 158' is across the coil 128' from the "hot" point 152' to ground. The principal metal-fluid interfaces here are provided by the electrodes 142' and 150'.

The resonant circuit 144' is series resonant at the r.f. carrier frequency and has desirably a very high L/C ratio to achieve low impedance to ground for the r.f. without adding substantial capacity to the d.c. circuit. The terminal 138', while serving as the output terminal for d.c. is at the same time at ground insofar as the r.f. is concerned. On the other hand, the terminal 156', while serving as the output terminal for the r.f. is at ground insofar as d.c. is concerned. The drip chamber of the type shown in U.S. Pat. No. 3,340,470 which would normally be required in line 130' is eliminated, thus obviating the attendant disadvantages previously mentioned.

The double-walled aperture tube 126' minimizes capacity effect which would leak current through the walls of the aperture tube between the liquid 124' and that which is in the interior of the tube 126' other than through the aperture, with attendant losses aNd resultant degradation of signal-to-noise ratio.

Considerable variation can be made in apparatus utilizing the invention without departing from he spirit or scope thereof as defined in the appended claims.

For instance, with proper choice of aperture diameters, apparatus such as that illustrated in FIG. 1 between the points 16 and 20, or FIG. 6, the entire flow in a pipe could be monitored for particle count and size. Apparatus illustrated in FIG. 3 could be modified by connecting conduit 62 to a source of any other suitable electrolyte compatible with the fluid of the main flow and the conduit could be connected to a waste sump or recycling means. Such a variation would be useful in cases where the particles are originally suspended in a fluid which does not have sufficient conductivity to permit efficient particle detection by the Coulter principle. All the embodiments illustrated could be physically rotated to place the sample-carrying coil on a vertical axis if the particles to be detected were subject to settling.

What it is desired to secure by Letters Patent of the United States is:

1. An electronic particle analyzing device for particles suspended in a fluid whose electrical properties are different from the electrical properties of the particles, characterized by the flow of suspension from one body of fluid to a second body of fluid through an electrical field established in a confined region between the bodies of fluid, the dimensions of the region with respect to the particle sizes being such as to enable changes in the impedance of the region caused by the passage of respective particles to be sensed, and comprising:

A. a pair of containers each having a body of liquid therein and a constricted region between them and there being means for causing the flow of liquid from the first container through the region to the second container, at least the first body of liquid in the said first container containing particles suspended therein, B. means insulating said containers electrically across said region and said means including structure defining said constricted region and confining the flow from said first to said second container, C. a pair of metal-fluid interfaces in contact with the respective bodies of liquid, D. a source of high frequency energy and means coupling the same to said interfaces whereby to establish an electrical field in said region, E. detector means coupled to said metal-fluid interfaces on opposite sides of said region and forming with said region a detecting circuit whereby to enable the detector means to respond to changes of the impedance of said electrical field with passage of particles through said region, and F. at least a portion of one of said first and second containers being of metal and in a coiled configuration to provide an electrical inductance and having capacitive means connected there-across to tune said portion to a condition of electrical resonance to provide a predetermined electrical impedance with respect to the detecting circuit without affecting flow of liquid through said portion.

2. The particle analyzing device as claimed in claim 1 in which said configuration is that of a helical coil.

3. The particle analyzing device as claimed in claim 1 in which said containers have means for connecting the same as a liquid by-pass circuit of a pipe carrying liquid with particles in suspension whereby to divert a portion of the main flow of the liquid in the pipe for measurement in said particle analyzing device.

4. The combination of the electronic particle analyzing device of claim 1 with a pipe carrying liquid with particles in suspension in which the pair of containers comprise a liquid by-pass circuit of the pipe and divert a portion of the main flow through the electronic particle analyzing device and return the same to the pipe after measurement.

5. The particle analyzing device as claimed in claim 1 in which the condition of resonance provides a very high impedance to flow of electrical current whereby to prevent loss of signal produced in said field by way of the fluid of said one of said containers.

6. The particle analyzing device as claimed in claim 1 in which said one of said containers provides one of said metal-fluid interfaces.

7. The particle analyzing device as claimed in claim 6 in which the other of said first and second containers is also of metal and provides the other of said metal-fluid interfaces.

8. The particle analyzing device as claimed in claim 6 in which the condition of resonance provides a very high impedance to flow of electrical current whereby to prevent loss of signal produced in said field by way of said one of said containers.

9. The particle analyzing device as claimed in claim 1 in which the other of said first and second containers is also of metal and has at least a portion thereof in a coiled configuration to provide a second electrical inductance and has second capacitive means connected there-across to tune said portion to a condition of electrical resonance to provide a second predetermined electrical impedance with respect to the detecting circuit without affecting flow of liquid through said portion of said other of said first and second containers.

10. The particle analyzing device as claimed in claim 9 in which the source of high frequency energy produces energy at a frequency at which the electrical inductances both provide a very high impedance to flow of electrical energy whereby to prevent loss of signal produced in said field by way of the fluid of either of said containers.

11. The particle analyzing device as claimed in claim 9 in which the source of high frequency energy produces energy at two different frequencies and in which the electrical inductances provide different impedances at the different frequencies.

12. The particle analyzing device as claimed in claim 10 in which said configuration in each case is that of a helical coil.

13. The particle analyzing device as claimed in claim 12 in combination with a pipe carrying liquid having particles in suspension therein in which the pair of containers comprise a by-pass to the pipe and divert a portion of the main flow through the electronic particle analyzing device and return the same to the pipe after measurement.

14. The particle analyzing device as claimed in claim 9 in which configuration in each case is that of a helical coil, there is a tail end of the first container and a leading end of the second container having a fluid connection through said insulating means, said insulating means having an aperture therein and combining with said fluid connection to provide aperture carrying means.

15. The particle analyzing device as claimed in claim 14 in which said metal-fluid interfaces are constituted by said tail and leading ends.

16. The particle analyzing device as claimed in claim 14 in which said aperture carrying means is offset from said containers and includes a structure having means to permit inspection of said aperture from both sides thereof.

17. The particle analyzing device as claimed in claim 15 in which said last means comprise sight glasses aligned with the aperture and being on opposite axial ends of said last-mentioned structure, said sight glasses being removable to give access to the interior of said structure.

18. The particle analyzing device as claimed in claim 1 in which the source and detector means are both connected to said metal-fluid interfaces.

19. The particle analyzing device as claimed in claim 1 in which the detector means are connected to said metal-fluid interfaces and in which the source is inductively coupled to said electrical inductance whereby to induce electrical current therein to establish said electrical field.

20. The combination as claimed in claim 4 in which said by-pass circuit includes a pair of inlet conduits connected to said pipe to withdraw liquid from said pipe and pump means are provided in each conduit operating in proportional synchronism to withdraw a predetermined ratio of liquid in the respective conduits, one conduit having filter means therein to remove all particles therefrom, the conduits being joined to form a single path leading to the first of said containers and to supply to said container a suspension of concentration less than that in the main flow of said pipe.

21. The particle analyzing device as claimed in claim 1 in which the first container comprises a vessel having the first body of liquid containing particles suspended therein, said second container comprises an aperture tube immersed in said first body of liquid and said portion being in the configuration of a helical coil and connected with said aperture tube, the second body of fluid being in said aperture tube and said helical coil, one metal-fluid interface being a first electrode in the first body and the other metal-fluid interface being a second electrode in the second body and connected electrically to said helical coil, there being in addition to said first source a second source of low frequency connected across said interfaces, the inductance being tuned to parallel resonance at the frequency of said high frequency source and serving as a ground for the low frequency source, a connection from the high frequency source to the second electrode, a connection from the low frequency source to the first electrode and having means therein serving as a ground for the high frequency source.

22. In an electronic particle analyzing device of the Coulter type having a conduit carrying particles suspended in a liquid whose electrical properties are different from those of the particles, an aperture in the conduit providing for passage of the suspension, the aperture being of such size relative to the particles that individual particles will cause respective detectable changes in the impedance of the liquid in the vicinity of the aperture, the conduit parts on opposite ends of the aperture being electrically insulated from one another across the aperture and each containing a separate body of fluid, a source of aperture current and detector means coupled to the fluid bodies at opposite ends of said aperture whereby to enable the detector means to respond to passage of particles through said aperture, the improvement herein which comprises:

the source of aperture current being a high frequency source, at least one of said conduit parts being made of conductive material and formed in a coiled configuration to provide an electrical inductance and having capacitive means tuning the same to a condition of electrical resonance to present some predetermined impedance to flow of high frequency current therethrough without affecting the flow of suspension therethrough.

23. The invention as claimed in claim 22 in which the configuration is that of a helical coil.

24. The invention as claimed in claim 22 in which the condition of resonance produces a high impedance to flow of electric current.

25. The invention as claimed in claim 24 in which both of said conduit parts are made of conductive material and both are formed in coiled configurations to provide electrical inductances and both have capacitive means tuning same to respective conditions of electrical resonance to present respective predetermined impedances to flow of high frequency electric current therethrough without affecting the flow of suspension therethrough.

26. The invention as claimed in claim 25 in which the configuration in both cases is that of a helical coil.

* * * * *